L. B. DOMAN.
PNEUMATIC SELF PLAYING MUSICAL INSTRUMENT.
APPLICATION FILED AUG. 8, 1906. RENEWED APR. 25, 1914.
1,118,189.
Patented Nov. 24, 1914.
7 SHEETS—SHEET 1.
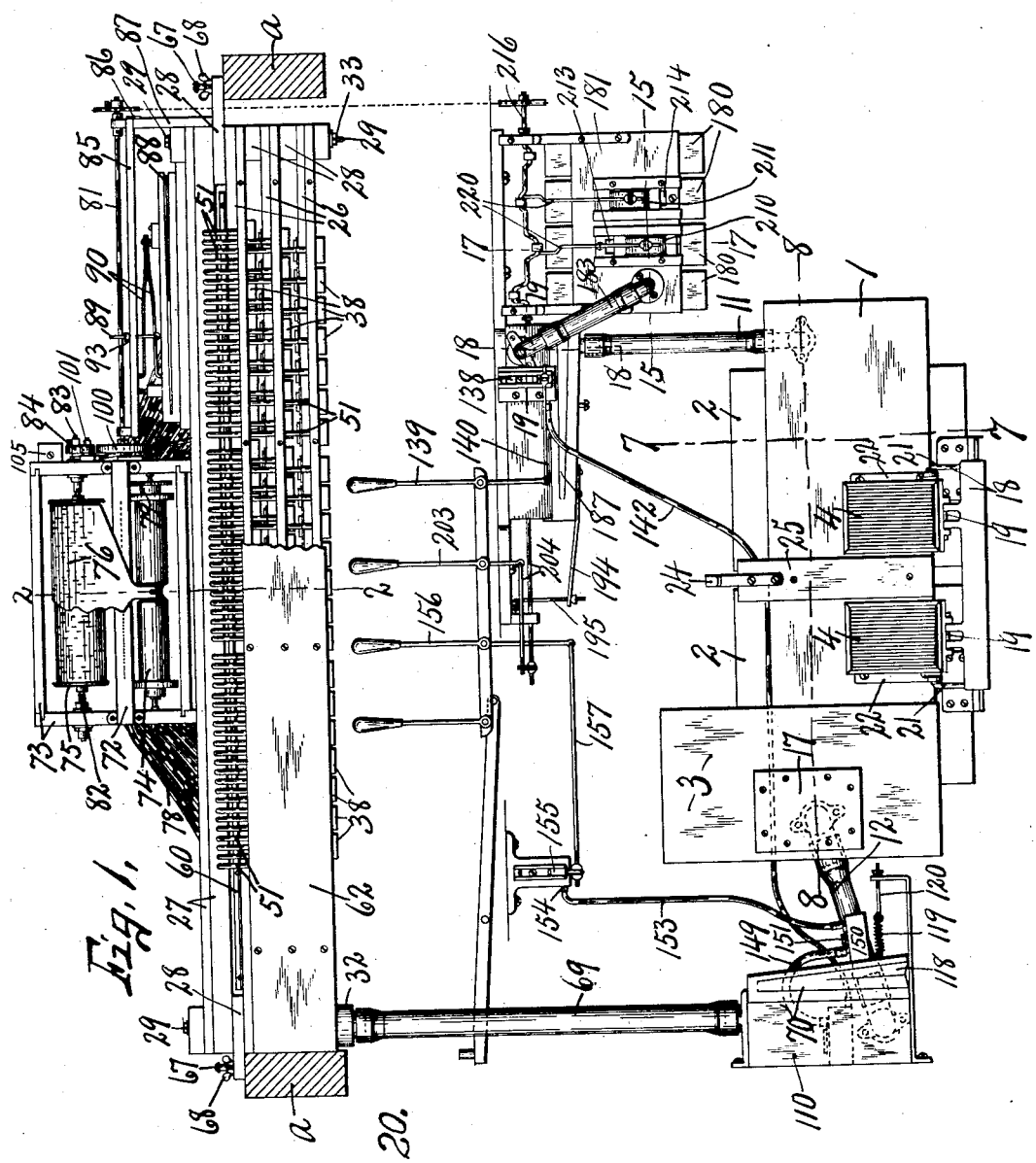

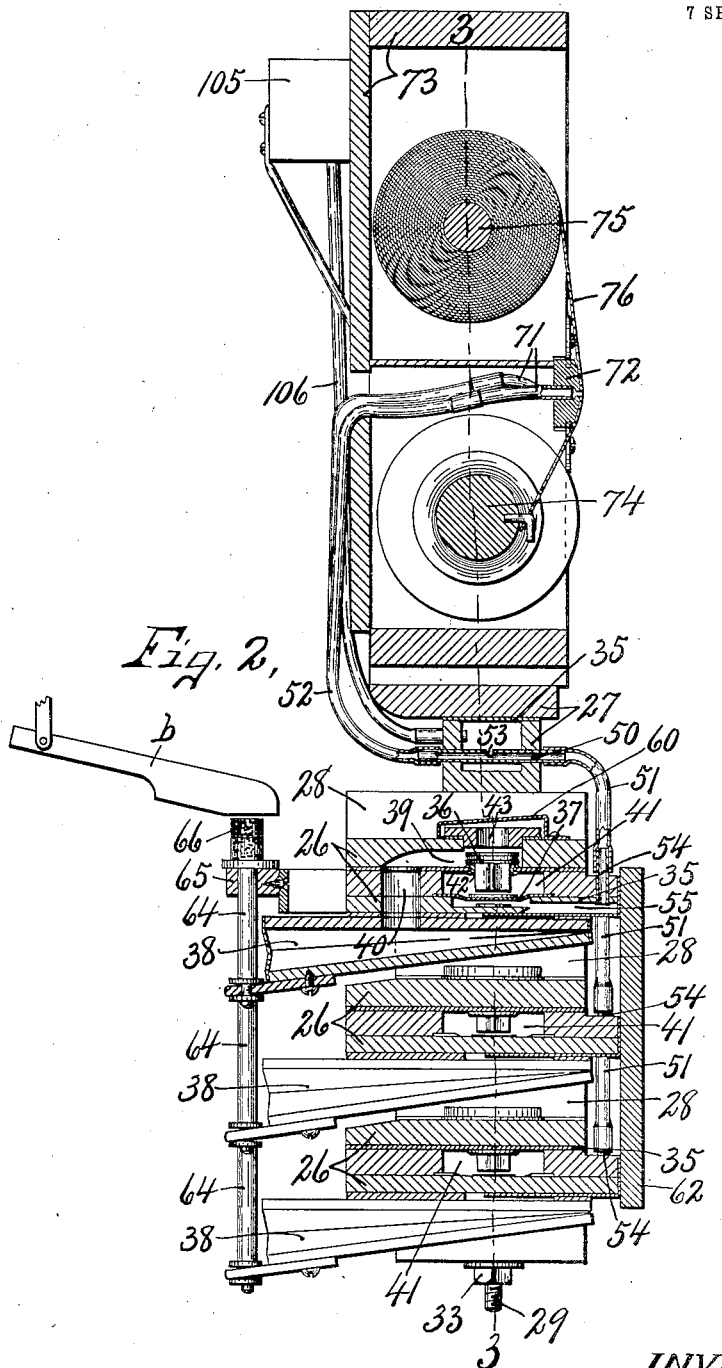

L. B. DOMAN.
PNEUMATIC SELF PLAYING MUSICAL INSTRUMENT.
APPLICATION FILED AUG. 8, 1906. RENEWED APR. 25, 1914.
1,118,189.
Patented Nov. 24, 1914.
7 SHEETS—SHEET 3.
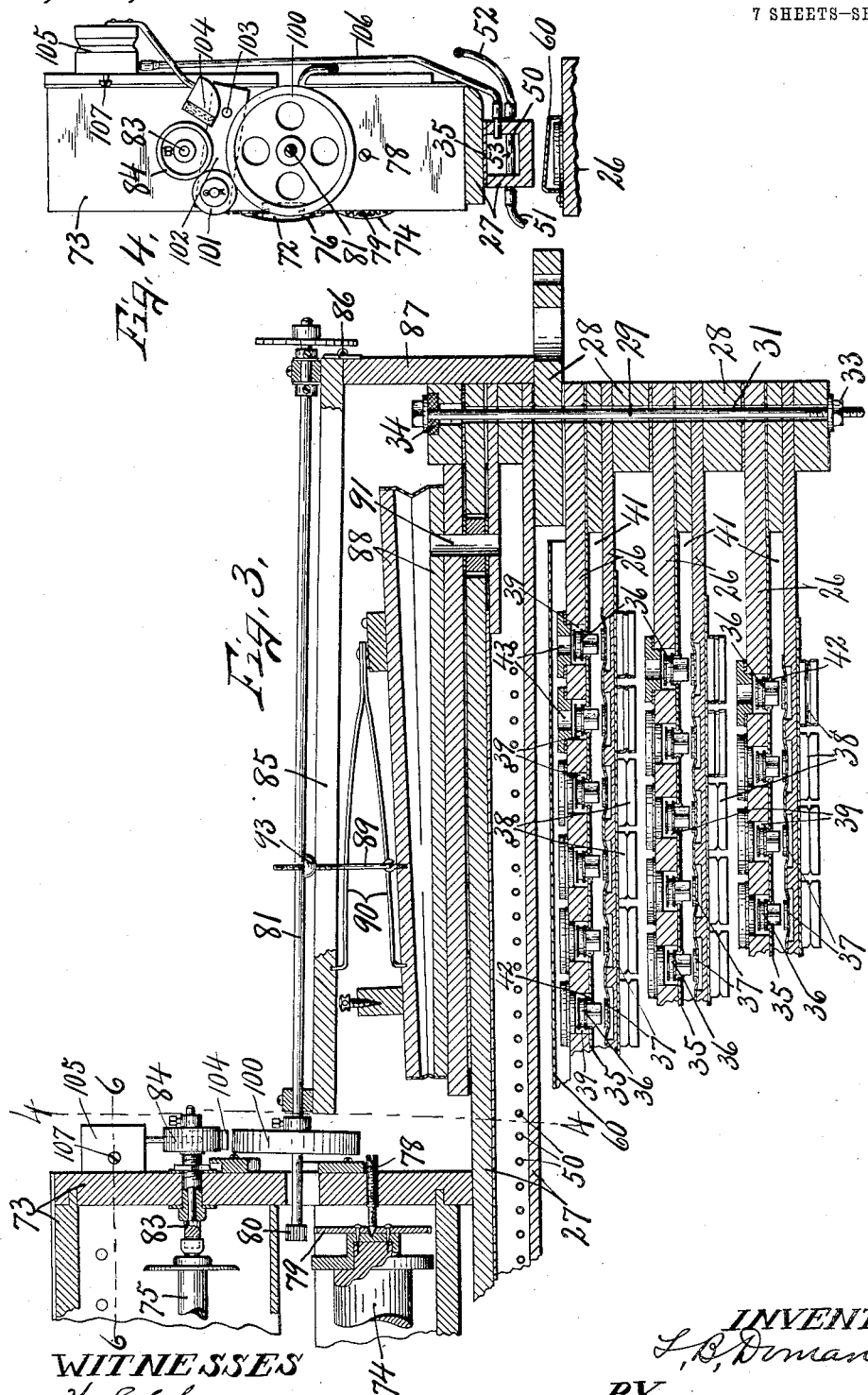
WITNESSES
H. E. Chase
O. C. Schorneck
INVENTOR
L. B. Doman
BY
Howard P. Denison
ATTORNEY

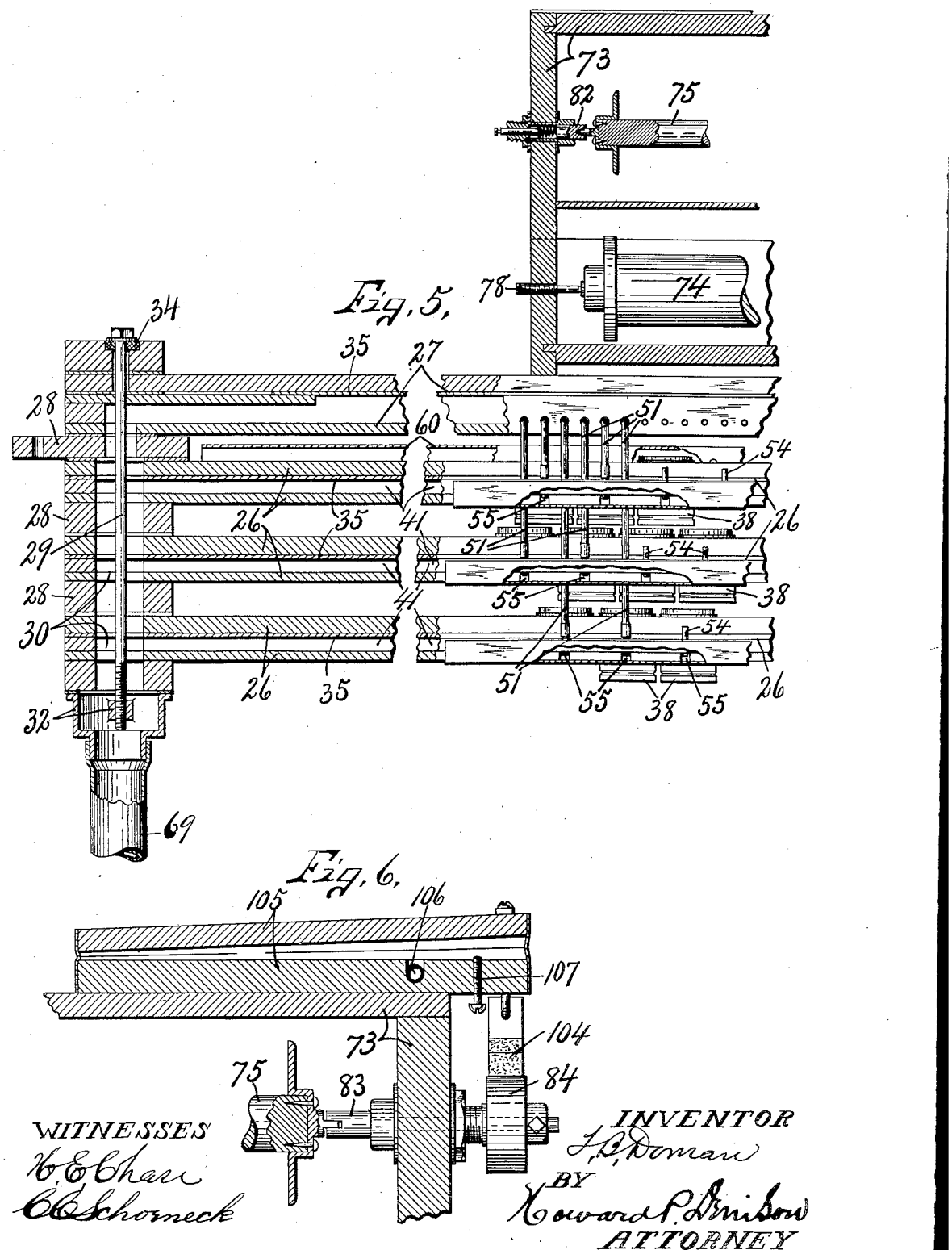

L. B. DOMAN.
PNEUMATIC SELF PLAYING MUSICAL INSTRUMENT.
APPLICATION FILED AUG. 8, 1906. RENEWED APR. 25, 1914.
1,118,189.
Patented Nov. 24, 1914.
7 SHEETS—SHEET 5.
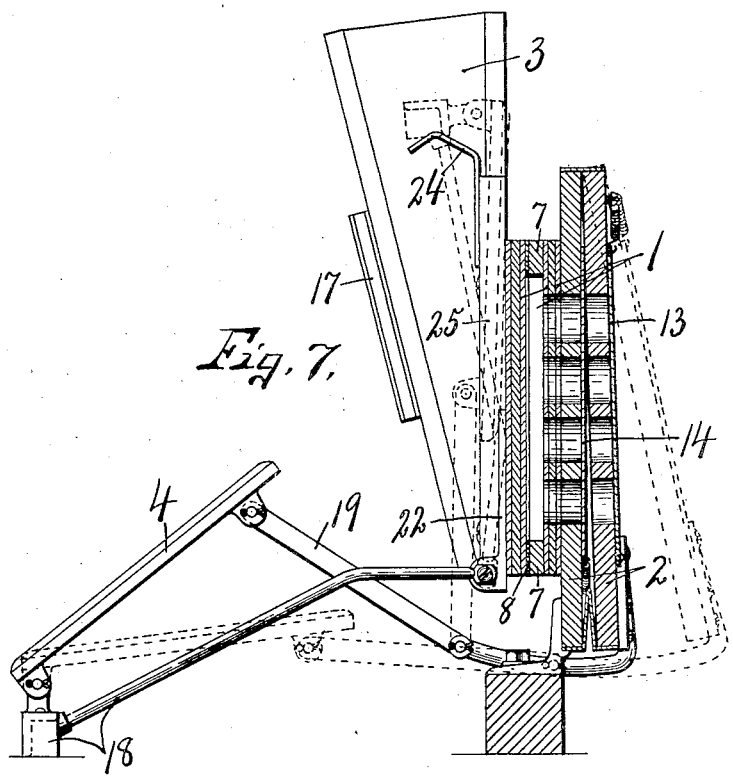
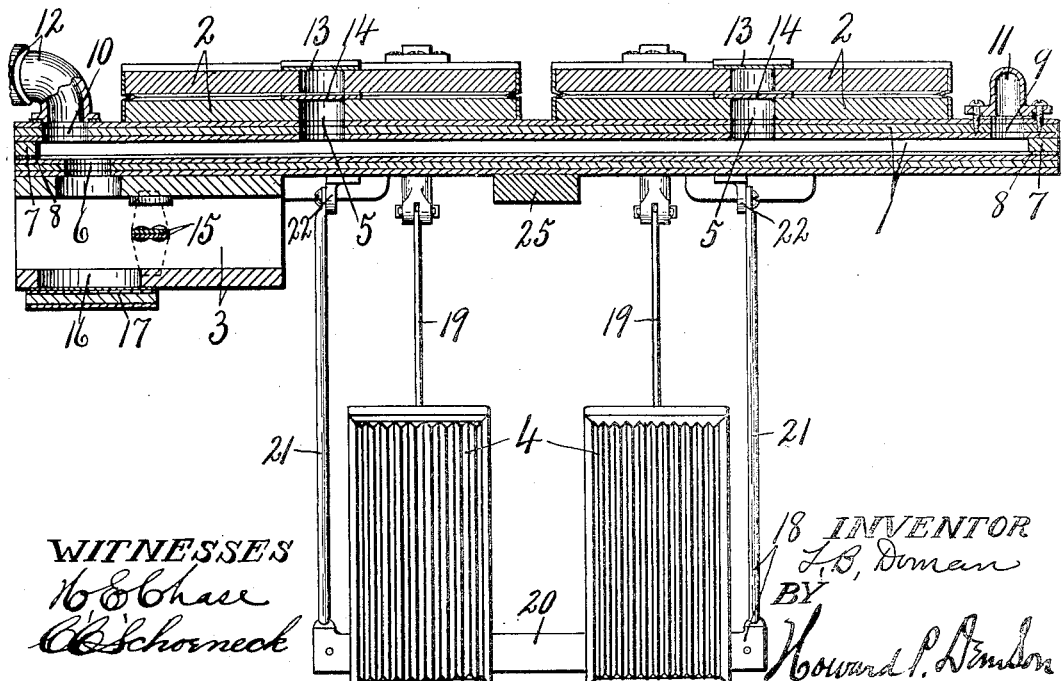

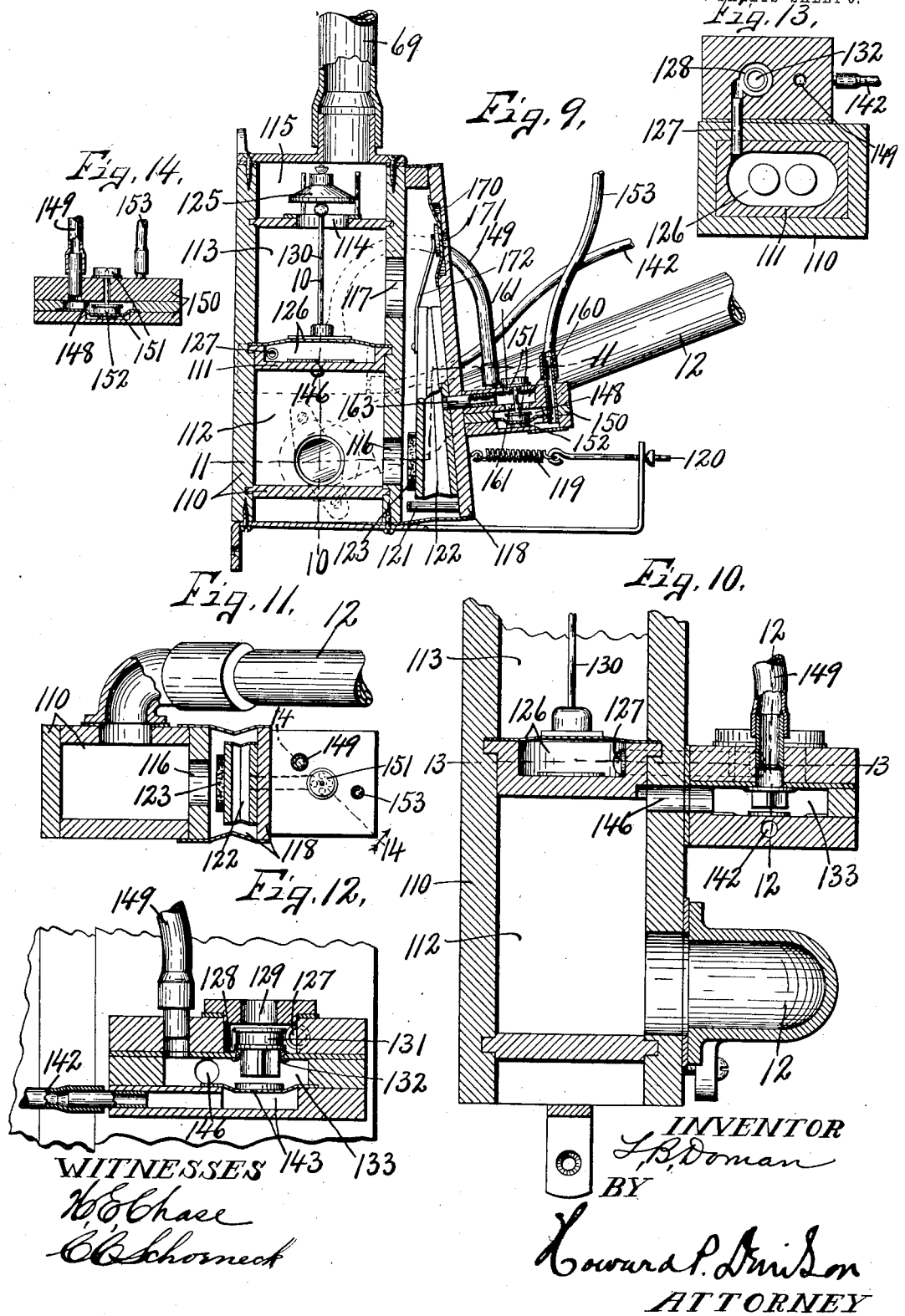

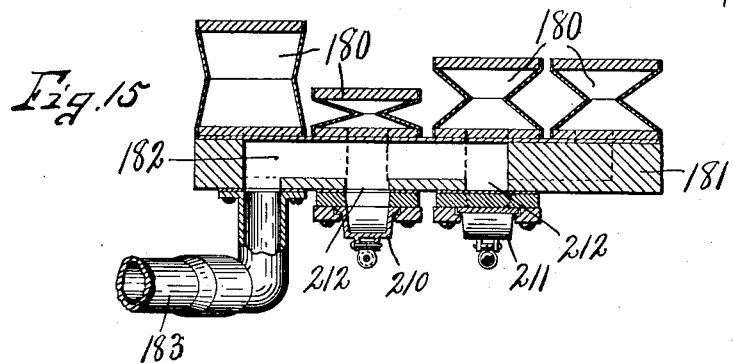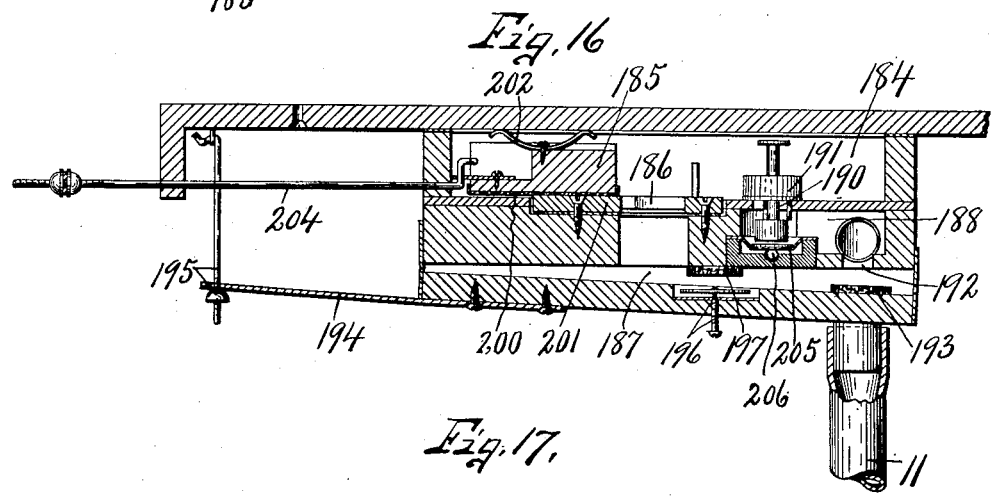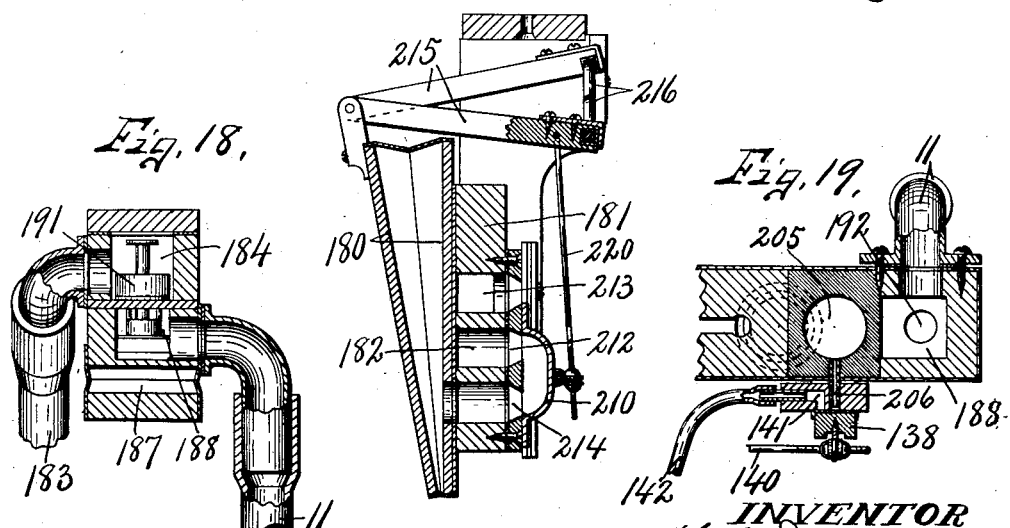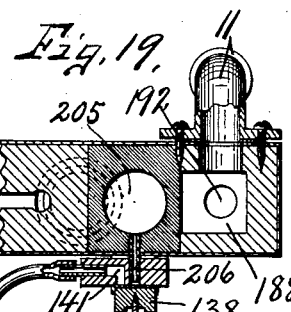

UNITED STATES PATENT OFFICE.

LEWIS B. DOMAN, OF ELBRIDGE, NEW YORK, ASSIGNOR TO AMPHION PIANO PLAYER COMPANY, OF ELBRIDGE, NEW YORK, A CORPORATION OF NEW YORK.

PNEUMATIC SELF-PLAYING MUSICAL INSTRUMENT.

1,118,189.   Specification of Letters Patent.   Patented Nov. 24, 1914.

Application filed August 8, 1906, Serial No. 329,692. Renewed April 25, 1914. Serial No. 834,493.

*To all whom it may concern:*

Be it known that I, LEWIS B. DOMAN, of Elbridge, in the county of Onondaga, in the State of New York, have invented new and useful Improvements in Pneumatic Self-Playing Musical Instruments, of which the following, taken in connection with the accompanying drawings, is a full, clear, and exact description.

This invention relates to certain improvements in pneumatic self-playing musical instruments in which the several mechanisms are incorporated within the case of the piano or similar instrument, constituting what is commonly known as an "Inside player," reference being had to my pending applications #221,995, filed August 24, 1904; #249,250, filed March 9, 1905 and the divisional applications thereof, viz: #333,214, filed September 4, 1906; #464,987 and #464,988 both filed November 28, 1908, and also to reissue application #594,228 filed November 25, 1910.

It is well known that the pianos made by different manufacturers vary materially in their construction, and that at the present time large numbers of these instruments are being equipped with inside mechanical players, the elements of which are permanently and inseparably built in the instrument.

My main object is to divide the self-playing adjunct of the instrument into a series of mechanical units, such as the exhaust action, or "wind-inducing device"; a "pneumatic action," comprising sound-producing devices; a "motor action," including the tempo controlling device for winding and rewinding the music-sheet, and a pneumatic "expression controlling action," each action constituting a mechanical unit to be manufactured separately and installed in the instrument in any available place, according to the structure of such instrument. In other words, I have sought to make each mechanical unit as a separate article of manufacture, capable of performing a distinct function, so that any one, or all of the several units may be furnished to different manufacturers and separately installed within the case without material alteration of any part of the instrument.

A further object is to provide slip-fit flexible connections, such as rubber tubes, for communication between the several pneumatic units so that the latter may be shifted relatively to each other and readily separated or re-united when necessary to facilitate the work of repairing or installation of such units.

Another object is to conserve the energy developed by the wind-inducing device throughout the several actions by obviating as far as practicable, air leakages and other energy consuming imperfections, and by so doing increase the general working efficiency of the entire playing apparatus.

Other objects and uses will appear in the following description.

In the drawings—Figure 1 is a front elevation of my improved mechanical piano-player showing the relative arrangement of the several mechanical units as incorporated in an upright piano, a portion of the dust-board of the valve-shelves being broken away. Fig. 2 is an enlarged transverse sectional view taken on line 2—2, Fig. 1. Fig. 3 is a somewhat smaller longitudinal sectional view taken on line 3—3, Fig. 2, showing one end of the pneumatic action and adjacent end of the winding and rewinding mechanism for the music-sheet. Fig. 4 is a sectional view taken on line 4—4, Fig. 3. Fig. 5 is a longitudinal sectional view, partly in elevation, of the left-hand end of the shelves and adjacent ends of the winding and rewinding rollers for the music-sheet. Fig. 6 is a horizontal sectional view taken on line 6—6, Fig. 3, showing the brake controlling pneumatic. Figs. 7 and 8 are enlarged sectional views taken respectively on lines 7—7—, and 8—8—, Fig. 1, showing the wind-inducing device in detail. Fig. 9 is an enlarged longitudinal vertical sectional view through the expression controlling mechanism seen at the lower left-hand side of Fig. 1. Figs. 10, 11, 12, 13, and 14, are sectional views taken respectively on lines 10—10 and 11—11— Fig. 9; 12—12— and 13—13, Fig. 10, and 14—14—, Fig. 11. Fig. 15 is a horizontal sectional view through the motor action taken on line 15—15, Fig. 1. Fig. 16 is an enlarged sectional view of the tempo controlling mechanism seen at the left of the motor mechanism in Fig. 1. Fig. 17 is an enlarged sectional view of the motor action taken on line 17—17, Fig. 1. Figs. 18, 19, and 20 are sectional views taken respectively on lines 18—18, 19—19, and 20—20, Fig. 1, the pipe leading to the motor pneumatics being omitted.

The wind-inducing or exhaust-device is secured within the base of the piano case to maintain a minus air pressure in certain parts of the system, and comprises a wind-chest —1—; a pair of exhausting bellows —2—; equalizing chambers —3— and suitable pedals, as —4—, for operating the exhausting bellows —2—.

The wind-chest —1— is common to both the exhausting and equalizing bellows —2— and —3— with which it communicates through suitable ports —5— and —6—6. The front and rear sides of the wind chest are each made of a plurality of layers of comparatively thin pieces of wood, glued together, and having their grains running transversely of each other to prevent warping, said sides being spaced apart by marginal spacing strips —7— of wood, and interposed layers —8— of comparatively thick paper, which allows a limited degree of expansion and contraction, or "come and go" of the joined parts without opening the joint, and at the same time this paper layer which is adhesively secured to the contiguous parts of the wind-chest —1— enables said contiguous parts to be split apart without destroying the wood in case it becomes necessary to separate said parts. This spacing apart of the front and rear sides of the wind-chest —1— forms an intervening comparatively shallow air chamber which is provided with additional ports —9— and —10—, one at each end, the port —9— opening into a conduit —11— which leads to the tempo controlling mechanism, presently described, while the port —10— opens into a conduit —12— which leads to the expression controlling mechanism, also presently described.

The exhausting devices —2— are permanently secured to the back of the wind-chest —1— and are provided with suitable check-valves —13— and —14—, the valves —13— permitting the exit of air from the exhausting devices —2— when the latter are compressed by the pedals —4—, but preventing the entrance of atmospheric air when distended. The valves —14— allow the exit of the air from the wind-chest —1— into the bellows —2—, but prevent entrance of air from said bellows to the wind-chest. The equalizing bellows —3— is permanently secured to the front side of the wind-chest —1—, the movable side of the bellows being provided with an opening —16— which is permanently closed by cap —17— adapted to be removed only when necessary to gain access to the interior of the bellows.

Each of the pedals —4— is pivotally mounted upon a vertically swinging frame —18— and is connected by a link —19— to the movable side of one of the exhausting devices —2—, each pedal and its link forming a toggle connection between the frame —18— and one of the exhausting devices, whereby when the pedal is depressed the bellows connected thereto is distended to produce a partial vacuum or minus atmospheric pressure in the wind-chest —1— and various parts of the system communicating therewith, as will be hereinafter described.

The frame —18— to which the pedals are pivoted comprises a cross-bar —20— and suitable rods —21— having their outer ends secured to opposite ends of the bar —20— and their inner ends pivotally attached to brackets —22— on the front side of the exhausting chamber —1—.

The purpose of the equalizer —3— is to assist the bellows —2— in maintaining a uniform air tension in the chamber —1— and different parts of the system communicating therewith and to compensate for the constantly varying demands upon the motive power, as for instance, when shifting from single notes to chords, and also in changing from pianissimo to fortissimo effects or sudden accentuations.

The pedal supporting frame is foldable upwardly from a substantially horizontal to a substantially vertical position, as shown by dotted lines in Fig. 7, and is held in its vertical position by means of a spring catch —24— which is fastened to a bar —25— on the wind-chest —1—, said catch engaging the intermediate portion of the bar —20—.

It is now obvious that the mere act of operating the exhausting devices —2— by means of pedals —4— and connecting links —19— produces a minus air pressure in the wind-chest —1— and equalizing chamber —3— as well as in all parts of the system which may be in communication with said wind-chest and that the minus pressure produced in the equalizing chamber —3— tends to collapse the latter against the action of its distending spring —15—, and that in case excessive demands are made upon the motive power through causes hereinbefore mentioned, the spring —15— which is quite stiff, tends to distend the bellows —3—, thereby assisting in maintaining a uniform minus pressure in the entire system which may be in communication with the equalizing chamber.

The pneumatic action or mechanical unit which is directly associated with the piano action is adjustably supported at its ends upon suitable cheek pieces —a—, on the sides or ends of the piano case, and consists essentially of a series of, in this instance three, valve-shelves —26— and a wind-chest —27— which are separably spaced apart, one above the other, by spacing blocks —28— and are clamped together by tie-bolts —29— passing through registered openings —30— and —31—, Figs. 3 and 5, the apertures —30— forming registering wind-ports for direct communication between the wind chest or exhaust chambers —14— in the interior of the valve shelves —26— and wind-chest —27—.

The lower ends of the tie-bolts —29— are preferably threaded and engaged with suitable nuts —32— and —33—, and their upper ends are shown as engaged with yielding washers —34— to allow for expansion and shrinkage and to maintain air tight joints between the valve shelves and wind-chests, thereby obviating any liability of air leakages at the joints. These shelves and wind-chests are preferably made of layers of wood with interposed layers —35— of comparatively thick paper or paste-board forming one of the sides of each valve shelf and wind-chest for the purpose of allowing a limited degree of expansion or shrinkage, or as it is technically known "come and go" of the wood layers, and also enabling the wood parts to be more easily separated or split apart when it is desired to gain access to the inclosed valve chambers or air ducts without liability of splitting the wood, the wood and paper layers of each shelf or wind-chest being adhesively secured together.

Each valve shelf contains a group of valves —36— and a corresponding group of primary pneumatics —37—, and also supports a group of striker pneumatics —38—, which in this instance, are permanently secured to the lower side of each shelf.

One of the wood layers of each shelf constitutes what may be termed a valve-board having a series of separate valve chambers —39— each communicating through a passage —40— with its companion striker pneumatic —38—.

Each valve shelf incloses an exhaust-chamber —41— which is common to all of the valves and their primary pneumatics —37—, and each valve chamber has a separate communication through a port —42— with its exhaust chamber —41—, and also communicates through a port —43— with atmosphere, the valve —36— playing between the ports —42— and —43—, normally closing the port —42—, and therefore, each striker pneumatic —38— normally communicates with atmosphere through the ports —40— and —43— and connecting valve chamber —39—, each valve being provided with an angular stem which is guided by the sides of the port —42— in proximity to the movable side of its primary pneumatic —37—.

The layer of paste-board —35— which is incorporated in each shelf is preferably interposed between the valve board and adjacent wood portions of the shelf so that if it becomes necessary to have access to the valves, the valve-board may be more easily separated from the remaining portions of the shelf by simply splitting the paste-board without liability of splitting or otherwise injuring the wood parts and enabling said parts to be reunited adhesively by simply replacing the paste-board.

The essential purpose of the wind-chests —27— is to afford a more convenient and efficient connection between the tracker and primary pneumatics by incorporating therein a series of straight transverse metal tubes —50— each having its ends extending some distance through and beyond the front and rear sides of the wind-chest for receiving flexible ducts —51— and —52—, and its intermediate portion provided with a comparatively small opening —53— communicating with the interior of the wind-chest.

Each of the valve-shelves —26— is provided with a series of metal tubes or ducts —54— arranged side by side in a substantially straight line, each communicating through a duct —55— with one of the primary pneumatics —37—.

The metal tubes —50— in the wind-chest —27— are disposed side by side in substantially the same horizontal plane, one for each of the primary pneumatics, and are each connected by one of the conduits —51— to its companion tube —54—. The lower ends of the tubes —51— which are attached to the tubes —54— of the lower valve shelves are passed through apertures in the front edges of the superposed valve-shelves, thereby keeping all of the tubes in substantially the same longitudinal plane.

The ports —43— in the upper shelf are covered by a dust-cap —60—, which is open at the ends to allow the entrance of atmospheric air, but prevents, in a measure, the accumulation of dust in the valve chambers, the similar ports in the lower shelves being similarly protected against the entrance of dust by the superposed shelves and striker pneumatics which lie directly over said ports in the underlying shelves.

As a further protection against the entrance of dust into the valve chambers, a dust-board —62— is secured to the front edges of the valve shelves to exclude, as far as practicable, the entrance of dust between the shelves and at the same time to conceal and protect the lower ends of the tubes —51— which are attached to the lower shelves.

Each of the striker pneumatics is connected to and operates one of the vertically slidable striker-rods —64— which are guided in apertures in a fixed bar —65— and have their upper ends provided with padded hammers —66— adapted to engage and operate the jack-whips —b— of the piano action.

The spacing blocks —28— between the upper valve shelf —26— and wind-chest

—27— are extended some distance beyond the ends of said shelves and wind-chest, forming ledges which overlie the cheek pieces —a— and which receive suitable adjusting screws —67— and a clamping screw —68— engaging the cheek pieces —a— for adjusting and holding the entire pneumatic action to bring the striker hammers —66— into proper relation with the jack-whips —b—.

The registering wind-ways —30— communicate with the chamber —41— or interiors of the valve shelves —26— and with the wind-chest —27— and are connected by a conduit —69— to an expression controlling device —70—, which in turn, is connected by the conduit —12— to the air exhausting device previously described.

The flexible conduits —51— and —52— are attached to the opposite ends of their respective tubes —50— with a slip fit so that they may be readily removed and a wire or similar instrument inserted directly through the tube —50— to clean out any dust or other foreign matter which may interfere with the free flow of air therethrough.

The flexible ducts —52— leading from the tubes —50— are attached at their upper ends to metal tubes —71— of a tracker-bar —72— which is mounted upon a supporting frame —73— for the winding and rewinding rollers, as —74— and —75—, for the music-sheet, as —76—.

The frame —73— is permanently secured to the top of the wind chest —27— directly over the valve shelves —26—, and consists of a box-like structure adapted to inclose the rollers —74— and —75—, which latter are located respectively below and above the plane of the tracker-bar —72—.

The roller —74— is journaled at its ends in axial adjustable bearings —78— in the ends of the frame —73—, one end of said roller being provided with a gear —79— which is adapted to be driven by a pinion —80— on a driving shaft —81—, presently described. The other roller which will be hereinafter described as the rewinding roller upon which the perforated music-sheet is originally wound and to which it is attached, is supported at one end in an axially spring-pressed bearing —82—, and its other end is detachably interlocked with a rotary spindle —83— having upon its outer end a friction roller —84—.

The driving shaft —81— which is comparatively long is journaled upon and is movable with a vertically movable rock-arm or lever —85— which is hinged at —86— to a fixed support —87— some distance from the pinion —80— so that as the arm or lever —85— is rocked upon its pivot the pinion —80— is thrown into and out of mesh with the gear —79— on the winding roller —74—. This vertical rocking movement of the shaft —81— and arm —85— is controlled by a pneumatic —88— and link 89 operating in conjunction with a spring —90—.

The pneumatic —88— is permantly secured to the top of the wind-chest —27— between the frame —73— and hinge —86— of the arm —85— and communicates through a port —91— with the interior of the wind-chest —27— so that as long as there is a minus pressure in the wind-chest —27— and valve shelves —26—, there is a similar minus pressure in the pneumatic —88—, operating to collapse the latter, the movable side of which is connected by the link —89— to the rock-arm —85—, thereby drawing the latter downwardly against the action of the spring —90— to engage the pinion —80— with the gear —79—.

The movable side of the pneumatic —88— is hinged at its end nearest the pinion —80— or most remote from the hinge —86— of the rock-arm —85—, while the tension of the spring —90— resisting the movable side —88— of the pneumatic is applied between the ends and preferably near the hinged end of said movable side, as best seen in Fig. 3, and the link —89— connects the movable side of the pneumatic and arm —85— intermediate their ends.

The spring —90— is preferably V-shape, and together with the link —89— is so relatively arranged as to establish a compound leverage between the movable side of the pneumatic and rock-arm —85—, the spring tending to separate the rock-arm and movable side of the pneumatic while the link —89— operates to resist such separation, and is provided with an adjusting nut —93— to regulate the movement of the rock-arm, thereby regulating the movement of the pinion —80— to correspond with the degree of movement of the movable side of the pneumatic —88—.

As shown in Fig. 3 of the drawings, the ends of the spring —90— are engaged with the pneumatic —88— and rock-arm —85— between the link —89— and hinge end of the movable side of said pneumatic, and therefore, the spring pressure tending to elevate the arm —85— exceeds that tending to close the pneumatic —88—, but when the tension in the pneumatic —88— is at atmosphere the tension of the spring —90— operating through the lever —85— and link —89— is sufficient to distend the pneumatic —88—, thereby elevating the free end of the shaft —81— and pinion —80— out of interlocking connection with the gear —79—.

A minus pressure is maintained in the pneumatic —88— as long as it is maintained in the valve shelves —26— thereby causing the collapse of said pneumatic to throw the pinion —80— into mesh with the gear —79— to wind the music-sheet from the roller —75— upon the roller —74—, but when it is desired to rewind the music-sheet upon the roller —75—, as for instance, at the end of the musical selection, communication between the wind-inducing device and pneumatic action, including the pneumatic —88—, is cut off the latter being flushed with atmosphere from the chamber —37— which is open to the tracker bar, thereby allowing the spring —90— to elevate the arm —85— to throw the pinion —80— out of mesh with the gear —79— of the winding roller and to immediately afterward cause the operation of the rewinding roller —75—. For this purpose I provide the shaft —81— with a friction wheel —100— which transmits reverse rotary motion to the friction wheel —84— through the medium of a friction wheel idler —101—. This idler is mounted on the free end of a rock-arm —102— which is pivoted at —103— to the adjacent side of the frame —73— to permit the idler —101— to gravitate with the rock-arm —102— away from the friction wheel —84— when the pinion —80— is in mesh with the gear —79— and to be forced into frictional engagement with the friction wheel —84— by the elevation of the friction wheel —100— so that the idler —101— is at rest during the playing of a selection.

It is desirable to keep the music sheet reasonably tight as it is drawn across the tracker-board in the operation of playing, and for this purpose the free action of the rewinding roller —75— is somewhat retarded by a brake-shoe —104— operating upon the periphery of the friction roller —84—, said brake-shoe being operated automatically through the medium of a pneumatic —105— which is connected by a conduit —106— to the exhaust-chamber of the wind-chest —27—, as best seen in Figs. 2, 4, and 6. The action of this brake is entirely automatic and is held in frictional engagement with the friction wheel —84— as long as the wind-chest —27— is in communication with the exhaust-device, but is released immediately upon cutting off communication between said wind-chest and the exhausting bellows; the degree of movement of the brake and its actuating bellows being regulated by an adjustable limiting stop, as a screw —107—, Fig. 6.

It will be seen from the foregoing description that when the pneumatic action is in communication with the exhausting device, the driving shaft —81— is automatically thrown into connection with the winding roller —74— by the collapse of the pneumatic —88— and that the brake —104— is simultaneously thrown into action to retard the action of the roller —75—, and thereby keep the music-sheet —76— reasonably tight during its travel across the tracker-bar —72—, but when it is desired to rewind the music-sheet upon the roller —75— the entire pneumatic action including the pneumatics —88— and —105— is cut off from communication with the wind inducing device by the mechanism hereinafter described, thereby allowing the distention of said pneumatics —88— and —105— to release the brake and simultaneously throw the rewinding mechanism into action under an increased speed.

The expression controlling mechanism is installed in the lower part of the piano case in the connection between the wind-inducing device and pneumatic action, and preferably consists of a comparatively small wind-chest —110— divided by a transverse partition —111— into two main compartments —112— and —113—, one of which, as —112—, is connected directly to the wind-inducing device by the conduit —12—, while the other compartment —113— is connected by a valved port —114— with a valve chamber —115— having direct communication with the pneumatic action through the conduit —69—.

The compartments —112— and —113— communicate through suitable ports —116— and —117— with the interior of an expression controlling pneumatic —118— which is permanently attached to one side of the wind-chest —110— and has its movable side connected by a spring —119— to an adjusting bar —120— whereby the tension of the spring may be varied to vary the resistance to the collapse of the pneumatic —118—. This pneumatic —118— forms an outside connection between the chambers —112— and —113— and, therefore, a greater or less degree of minus pressure is maintained in said pneumatic tending to draw its movable side toward the port —116— against the action of the spring —119—, the degree of action of the movable side of said pneumatic being limited by a stop —121—.

Inclosed within and mounted on the movable side of the pneumatic —118— is an auxiliary pneumatic —122— having its movable side facing the port —116— and carrying a porous valve —123— adapted to vary the degree or size of the opening between the exhaust chamber —112— and interior of the pneumatic —118—, thereby varying the air tension in the chamber —113— and pneumatic action which may be in communication therewith.

It is evident that the air-tension in the chamber —112— is always practically the same as that in the wind-inducing device, but the pneumatics —118— and —122— operating the valve —123— control the air tension in the pneumatic —118— and chamber —113— and pneumatic action in communication with the latter so that when the valve —123— is full open the sound-producing devices of the pneumatic action will be operated with a greater degree of force or power than when the valve —123— is partially closed. This enables the operator to closely regulate the expression from *pp* to *ff*, and vice versa. Communication between the wind-inducing device and pneumatic action is, therefore partially controlled by the pneumatics —118— and —122—, but such communication is absolutely opened or closed by means of a valve —125— for the port —114—. The operation of this valve is controlled by a pneumatic —126— forming a part of the transverse partition —111— between the chambers —112— and —113—. The movable side of the pneumatic —126— forms one side of the chamber —113— in which a partial vacuum is maintained, while the interior of the pneumatic normally communicates with atmosphere through a duct —127—, valve-chamber —128— and port —129— leading from the valve chamber to atmosphere, thereby distending the pneumatic —126— which operates through a rod or stem —130— to elevate or open valve —125— and its port —114— to establish direct communication between the chamber —113— and pneumatic action through the conduit —69—. The valve —125— is preferably made of metal and is self-closing by its own gravity as soon as the air-tension in the pneumatic —126— is reduced below atmosphere, as presently described.

A valve —131— is guided in the port —132— and is movable in the valve-chamber —128— to control communication between said valve-chamber and atmosphere, and also to control communication between said valve chamber and exhaust chamber —133—.

The duct —127— leads from the valve chamber —128— directly into the pneumatic —126— and during the operation of playing a valve —131— normally closes a port —132—, leaving the port —129— in direct communication with the pneumatic —126— through the duct —127— to keep said pneumatic —126— inflated for holding the valve —125— open, and thereby maintaining communication between the wind-inducing device and pneumatic action.

When the music-sheet reaches the end of its winding on the roller —74— across the tracker —72— it is immediately rewound on the roller —75— and at the same time that the rewinding begins the pneumatic action is cut off from communication with the wind-inducing device by the closing of the valve —125— which is affected by the deflation of the pneumatic —126— and gravity of the valve. For this purpose a valve —138—, Fig. 19, is operated manually through the medium of a lever —139— and connecting rod —140— to open and close a vent —141— which is connected by a flexible duct —142— to the interior of a primary pneumatic —143— having its movable part forming one side of the exhaust chamber —133— and adapted to operate the valve —131— to open the port —132— and close the port —129—, thereby establishing communication between the exhaust chamber —133— and duct —127— leading into the pneumatic —126—. By shifting the valve —138— to open the vent —141— to atmosphere the latter instantly enters and inflates the primary pneumatic —143— to operate the valve —131— thereby opening the port —132— and closing the port —129— to permit the air to be exhausted from the pneumatic —126— through the duct —127—, whereupon the valve —125— descends by its own gravity to close the port —114— and cut off communication between the wind-inducing device and pneumatic action. It is now clear that as long as the vent —141— is closed as shown in Fig. 19, the pneumatic —126— will be open to atmosphere through the port —129— and duct —126— to keep the valve —125— open, thereby maintaining communication between the wind-inducing device and pneumatic action at the will of the operator. This valve —138— is normally closed and is only open when it is desired to rewind the music-sheet by uncovering the vent —141— to allow the air to enter through the tube —142— into the primary pneumatic —143—, which being inflated, operates the valve —131— to close communication between the pneumatic —127— and atmosphere and to open communication between said pneumatic —127— and the exhaust-chamber —133—, thereby establishing the same air tension in the pneumatic —126— as in the chamber —113—, allowing the weighted valve —125— to close automatically.

The exhaust chamber —133— is in direct communication through a passage —146— with the exhaust-chamber —112— and is, therefore, in direct communication with the wind-inducing device. This exhaust-chamber —133—, and therefore, the wind-inducing device is in direct communication with an exhaust-chamber —148— through a conduit —149—, as best seen in Figs. 1, 9, 10, and 12.

The exhaust-chamber —148— is inclosed in a suitable valve-shelf —150— which contains a double valve —151— and a primary pneumatic —152—, the latter communicating through a conduit —153— with an air vent —154— having a valve —155— which is controlled by a lever —156— and connecting rod —157—, best seen in Fig. 1.

The valve 155— is normally closed preventing the entrance of atmospheric air to the pneumatic —152—, which latter has its movable side forming one side of the exhaust-chamber —148— in which a partial vacuum is maintained by the wind-inducing device through the conduit —149—.

The valve shelf —150— incloses a chamber —160— located between the valves —151— and having opposite ports —161—, one port opening to atmosphere and the other communicating with the exhaust chamber —148—, while the portion of said chamber 160 between said ports communicates through a conduit —163— with the interior of the auxiliary pneumatic —122—.

The valves —151— are mounted on the same stem, one of them opening outwardly and normally closing the ports which open to atmosphere, while the other valve is normally open and controls communication between the chamber —160— and exhaust-chamber —148—. The auxiliary pneumatic —122— is, therefore normally in communication with the exhausting device through the conduit —163— and chambers —160— and 148— so that while the pneumatic —118— normally tends to close the valve 123— by moving the auxiliary pneumatic —122— bodily toward the port —116—, pneumatic —122— is at the same time partially collapsed, tending to draw the valve 123— away from the port —116—, such action being accelerated by a pneumatic —170— on the movable side of the main expression controlling pneumatic —118—, as best seen in Fig. 9. This pneumatic —170— opens to atmosphere through a port —171— and has its movable side engaged with an arm 172 rigid on the movable side of the pneumatic —122— so that as soon as the air tension within the pneumatics —118— and 122— is equalized below atmosphere, the atmospheric pressure acting upon the pneumatic —171— causes the latter pneumatic to engage the arm —172— and hold the auxiliary pneumatic 122— in its collapsed position with the valve 123— full-open for fortissimo expression.

When a softer expression is required the valve 155— is opened allowing atmospheric air to enter through the tube 153— and into the primary pneumatic —152—, thereby operating the valves 151— to close communication between the auxiliary pneumatic —122— and the exhausting chamber —148— and to open communication between said pneumatic and atmosphere, by which said pneumatic is inflated, bringing the valve 123— into closer proximity to the port —116—, and thereby reducing the air tension in the chamber 113— and pneumatic action connected thereto.

The distention of the pneumatic —122— is practically instantaneous upon the opening of the valve 155— by reason of the fact that the area of said pneumatic acted upon by the inflowing atmospheric air is considerably greater than the area of the pneumatic —170— exposed to atmosphere so that the arm —172— readily collapses the pneumatic 170.

I have now described the mechanism involved in the expression controlling device, as associated with the pneumatic action and wind-inducing device previously described.

The motor action and its governing mechanism for driving the shaft —81— and controlling the speed of action of the winding and rewinding rollers, preferably consists of a series of, in this instant four, motor pneumatics —180— which are permanently secured to a valve-board —181— having an exhaust chamber —182— connected by a conduit —183 to a valve chest 184. This valve-chest contains a slide-valve 185 movable across a tapering opening 186— which communicates with a tempo governing pneumatic —187— permanently secured to the valve chest. This valve chest is also provided with an exhaust chamber —188— which communicates directly with the wind-inducing device —1— through the conduit —11— and is also connected to the valve chamber —184— through a port —190— having a valve 191 for controlling communication between the chambers —188— and 184— at one side of the passage 186.

The chamber —188— communicates directly with the interior of the pneumatic —187— through a port —192— having a porous valve —193— which is mounted directly upon the movable side of the pneumatic —187—, thereby establishing direct communication between the pneumatic 187— and wind-inducing device, although the air tension in the pneumatic —187— and chamber 184— connected thereto, through the passage —186— is controlled by the position of the valve 193.

The reduced pressure which is constantly maintained in the pneumatic —187— during the operation of the wind-inducing device tends to close the valve 193— against the port —192— which is resisted by a spring —194—, and means, as a threaded rod or link —195— for varying the tension of the spring.

The hinged end of the movable side of the pneumatic —187— is somewhat remote from the valve —193— and in order to increase the resistance to the closing of said valve as it approaches the port —192—, I provide an intermediate fulcrum pin or plate —196— adapted to engage a bearing —197— on the fixed side of the pneumatic so that when the movable side of the pneumatic is drawn toward the fixed side, the fulcrum pin or plate 196— engages the bearing —197— nearer the valve or further from the connection of the spring arm —194— with the adjusting rod —195— which materially increases the resistance to the complete closing of the valve. In other words, the mechanism just described affords an automatic means for increasing the resistance to the closing of the valve 192— during its closing action to prevent positive cut-off between the wind-inducing device and motor mechanism.

The valve 185— is usually made of wood with a leather facing —200— engaging a metal plate —201—, in which the passage 186— is formed, said valve being spring pressed against the metal plate by a spring —202— and is moved back and forth along the plate by means of a hand-lever 203 and connecting links —204. The valves —185— and 193— control communication between the wind-inducing device and chamber 184— through the pneumatic 187—, which latter, together with the valve 185— operates to regulate the air tension in and consequent speed of action of the motor pneumatics.

The valve —191— controls direct communication between the wind-inducing device and motor pneumatics, such valve being normally closed and is opened by a primary pneumatic —205— only when desired to rewind the music-sheet at an increased speed. For this purpose the primary pneumatic —205— is provided with a vent duct —206— as best seen in Fig. 17, which is normally closed to atmosphere by the valve —138—.

When it is desired to rewind the music-sheet the valve 138— is shifted in the manner previously described by the lever —139— and connecting link —140— to uncover the ports or ducts —141— and 206— thereby admitting atmospheric air into the primary pneumatic —205—, inflating the latter, which operates the valve —191— to establish direct communication between the chambers —188— and 184—, the first named chamber being in direct communication with the wind-inducing device, while the latter chamber is connected directly to the exhaust chamber 182 of the valve-shelf —181.

The valve-chest —181— is provided with a pair of slide valves —210 and 211—, each associated with a group of three ports —212, 213, and 214. The ports —212— are both connected to the exhaust chamber 182— and each of the valves 210 and 211 is adapted to cover two of the ports of each group, the ports 213 and 214— of each group being alternately opened to atmosphere. The lower ports 214 of each group communicate respectively with the interiors of the two intermediate pneumatics —180— while the upper ports —213— of each group communicate respectively with the two outer pneumatics —180—. The movable sides of these pneumatics are connected by links —215— to a crank-shaft —216—, the crank-arms for the two pneumatics at one end being offset in diametrically opposite directions, while the crank-arms for the other two pneumatics are also offset in diametrically opposite directions, but at right angles to the first named crank-arms. In other words, the crank-arms connected to the two intermediate pneumatics are arranged on a quarter turn or at right angles to each other and their connecting links, as 215— are connected by adjustable rods 220— to the valves 211— and 210— while the other two crank-arms at the end are also arranged on the quarter-turn relatively to each other. By this arrangement of the ports and slide valves and connection of the latter in the manner described with the crank-shaft, but two valves are necessary to control the operation of the four pneumatics because each valve is made to alternately connect two pneumatics with the wind-inducing device and atmosphere at each revolution of the crank-shaft. For instance, when the crank-arm connected to one of the valves moves such valve in position to connect the lower port —214— of one pneumatic with the companion-exhaust port 212, the other companion port 213— for another pneumatic is open to atmosphere, causing the deflation of the first named pneumatic and distention of the last named pneumatic, but as soon as the crank-arm begins to change positions to shift the valve, as for instance on the upper half-turn of the crank-arm, the same valve opens the lower port 214— and its pneumatic to atmosphere and connects the upper port 213 and its pneumatic with the exhaust port, the first named operation being repeated upon the other half revolution of the same crank-arm. It, therefore, follows that if the crank arm upon which the other valve is connected is a quarter-turn in advance of the first named crank-arm when one of the valves is full-open in either of its extreme positions, the other valve is in position to close all of its ports, although one or the other of the latter are immediately placed in communication with the exhaust chamber or atmosphere upon the shifting of the other valve from its extreme position.

The operation of my invention, briefly described, is as follows: A minus pressure is maintained in the wind-chest —1— and equalizing chamber —3— by the operation of the bellows —2— through the medium of the pedals —4—. This minus pressure or low air tension is communicated through the conduit —12— to the exhaust-chamber —112—, and thence, through the expression controlling pneumatic —118—, exhaust chamber 113—, open port —114— and conduit —69— to the exhaust chambers —27— and 41— of the pneumatic-action, the valve —125— being held open by the inflation of the pneumatic —126— by atmosphere aided by the minus pressure in the chamber 113—. At the same time the same low tension is maintained in the chamber —188— of the motor controlling device through the conduit —189— leading from the chamber —1—. This partial vacuum or inequality of pressure within and without the pneumatics —118— and 187— which may be designated respectively, as the expression and tempo-controlling pneumatics tends to close or collapse them against the action of their respective resistance springs —119— and 194—, thereby tending to close the valves —123— and 193—, both of which are porous and therefore, always allow a slight leakage of the air through the ports —116— and 192— respectively, even though said valves may be in their extreme closed position.

The inner pneumatic —122— is, however, normally collapsed and therefore, holds the valve —123— open to produce fortissimo effects, but if a softer tone is required, the lever —156 is operated to open the valve 155—, thereby admitting atmospheric air to the primary pneumatic —152—, and operating the valve 151— to admit atmospheric air to the auxiliary pneumatic —122—, which partially closes the valve 123—, thus lowering the air tension in the chamber 113— and pneumatic action connected thereto, the reduced air tension correspondingly reducing the power with which the striker pneumatics are actuated. If it is desired to control, the tempo or speed of action of the motor pneumatics, the valve 185 is shifted by the lever —203— to partially close communication between the pneumatic —187— and chamber —184—, which is connected directly to the exhaust-chamber 182— of the valve-board 181— of the motor action, and the reduced tension therefore, decreases the speed of action of the pneumatics 180— and driving shaft 216—, the latter being connected to the shaft 81— by suitable sprocket-chain, as best seen in Fig. 1.

It will be seen from the foregoing description taken in connection with the accompanying drawings that the several mechanical units constituting the automatic player are connected by flexible conduits, that is, the tempo-controlling part of the motor action communicates directly with the wind inducing device through a flexible conduit —11—; the expression controlling mechanism communicates directly with said wind inducing device through the flexible conduit —12— to the pneumatics action involving the sound producing devices communicating direct with the expression controlling mechanism through a flexible conduit —69—, all of said flexible conduits having slip fit connections with their respective mechanisms which not only enables the mechanical units to be readily assembled or taken apart, but also permits said mechanisms to be adjusted relatively to each other to better locate them in available parts of the piano case in which they are installed. The invention, therefore, relates more particularly to the general combination of the several mechanical units and their connections one with the other and to certain specific devices, the action of which affects two or more of the mechanisms. For example, the valve —125— and its actuating pneumatic —126— is controlled by the manually operated valve —138— to control communication between the wind inducing device and pneumatic action of the sound producing devices, and at the same time allowing the distention of the pneumatic —88— to throw the winding mechanism out of action and the rewinding mechansm into action, the valve —138— and mechanism controlled thereby also establishing direct communication between the motor action of the wind inducing device so as to cause said motor action to operate with increasing speed under the maximum air tension of the wind inducing device to rewind the music sheet with increased speed.

What I claim:

1. In a pneumatic self-playing musical instrument, a wind-inducing device, a sound producing action connected to the wind-inducing device, an expression governing pneumatic forming a part of said connection, a normally open valve in the connection between the expression governing pneumatic and action, a pneumatic actuator normally holding said valve open, a motor having a direct connection and an indirect connection with the wind inducing device, a tempo-regulating pneumatic forming a part of the indirect connection, a normally closed valve in the direct connection, a pneumatic actuator for the last named valve, and means operable at will for controlling the action of both of the pneumatic actuators whereby the first named valve is closed and the last named valve simultaneously opened.

2. In a pneumatic self-playing musical instrument, a wind-inducing device, a sound producing action connected to the wind-inducing device, an expression governing pneumatic forming a part of said connection, a valve in the connection between the expression governing pneumatic and action, a pneumatic actuator normally holding said valve open, means controlled at will for alternatingly placing said actuator in communication with the exhaust device and with the atmosphere, a pneumatic motor action having a direct connection and an indirect connection with the wind inducing device, a tempo-regulating pneumatic forming a part of the indirect connection, a normally closed valve in the direct connection, a pneumatic actuator for the last named valve, and means actuated by a part of the first named means for admitting atmospheric air to the last named pneumatic actuator when the first named actuator is placed in communication with the exhaust device, whereby the last named valve is opened at the same time that the first named valve is closed.

3. In a self-playing musical instrument, a wind-inducing device, a sound producing action connected to said device, an expression governing pneumatic forming a part of said connection, a valve in the connection between the expression governing pneumatic and action, a pneumatic actuator normally in communication with the atmosphere for holding the valve open, means controlled at will for placing said actuator in communication with the exhaust device to close the valve, a motor action having a direct connection and an indirect connection with the wind inducing device, a tempo-governing pneumatic forming a part of the indirect connection, a normally closed valve in the direct connection, a normally deflated pneumatic actuator for the last named valve, and means actuated by a part of the first named means for admitting atmospheric air to the last named actuator at the same time that the first named actuator is placed in communication with the exhaust device.

4. In a pneumatic self-playing musical instrument, a wind-inducing device, a sound producing device connected to the wind-inducing device, an expression governing pneumatic forming a part of the connection between said device and action, an auxiliary pneumatic within and upon the movable side of the expression governing pneumatic for additionally governing the expression, and a pneumatic actuator controlled by the air tension in the expression pneumatic for controlling the operation of the auxiliary pneumatic.

5. In a pneumatic self-playing musical instrument, a wind-inducing device, a sound producing device connected to the wind-inducing device, an expression governing pneumatic forming a part of the connection between said device and action, an auxiliary pneumatic within and upon the movable side of the expression governing pneumatic for additionally governing the expression, a pneumatic actuator controlled by the air tension in the expression pneumatic for controlling the operation of the auxiliary pneumatic, a valve in the connection between the expression governing pneumatic and sound producing action, and voluntarily controlled pneumatic actuating means for said valve.

6. In a pneumatic self-playing musical instrument, a wind inducing device, a sound producing action, a motor action, a connection between the sound producing action and wind inducing device, a separate connection between the motor action and wind inducing device, a normally open valve in the first named connection, a pneumatic actuator for said valve, a separate valve in the connection between the motor action and wind inducing device, a tempo-governing pneumatic connected in the last named connection around the normally closed valve, a pneumatic actuator for the normally closed valve, a valve chamber having two atmosphere ports, one of which communicates with the pneumatic actuator for the normally closed valve, a valve for opening and closing said ports, and means brought into action by the opening of the other port for connecting the first named pneumatic actuator to the exhaust device to allow the first named valve to close.

7. In a self-playing musical instrument, a wind-inducing device, a sound producing action connected thereto, an auxiliary expression governing pneumatic in the connection, means under the control of the operator for placing the auxiliary pneumatic alternately in communication with the atmosphere and with the exhaust device, a separate pneumatic actuator for the said pneumatic having one side exposed to the atmosphere and its other side forming a part of one side of said connection.

8. In a pneumatic self-playing musical instrument, separately operable expression regulating pneumatics one within the other, and an additional pneumatic actuator controlled by the air tension in the outer pneumatic for actuating the inner pneumatic.

9. In a pneumatic self-playing musical instrument, separately operable expression regulating pneumatics one within the other, the outer pneumatic having a port opening to the atmosphere, a pneumatic actuator covering the inner side of said opening, and connections between said actuator and inner pneumatic.

10. In a pneumatic self-playing musical instrument, a wind-inducing device, a sound producing action, a wind chest having separate chambers one of which is in constant communication with the wind-inducing device, the other chamber normally communicating with the sound producing action, a valve in the connection between the last named chamber and sound producing action, a pneumatic actuator dividing said chambers from each other, connections between said actuator and valve and an expression governing pneumatic connecting said chambers around said pneumatic actuator.

11. In a pneumatic self-playing musical instrument, a wind-inducing device, a sound producing action, an air chamber in constant communication with the wind-inducing device, an additional chamber connected to the sound producing action, a valve controlling communication between the additional chamber and sound producing action, a pneumatic actuator, located between said chambers, connections between said actuator and valve and means under the control of the operator for alternately connecting said actuator with the atmosphere and with the exhaust device.

12. In a pneumatic self-playing musical instrument, a wind-inducing device, a sound producing action, a wind chest having separate chambers and separate ports communicating therewith, one of the chambers being connected to the exhaust device and the other chamber connected to the sound producing action, an expression governing pneumatic connecting said ports, a pneumatic actuator between said ports, a valve between the actuator and sound producing action and also located in the connection between the expression governing pneumatic and said action, connections between the valve and said actuator, and means under the control of the operator for alternately placing said actuator in communication with the atmosphere and with the exhaust device.

13. In a pneumatic self-playing musical instrument, a wind-inducing device, a pneumatic motor action and a sound producing action, separate connections between said action and wind-inducing device, a valve in the connection between the wind-inducing device and sound producing action, a separate valve in the connection between the wind-inducing device and motor action, a tempo regulating pneumatic connected to the connection between the motor action and wind inducing device around the valve in such connection, separate pneumatic actuators for said valves, and means under the control of the operator for simultaneously inflating one actuator and deflating the other actuator.

14. In a pneumatic self-playing musical instrument, a wind-inducing device, a pneumatic motor action connected thereto, a normally closed valve in such connection, a tempo regulating pneumatic connected to said connection around the normally closed valve, a sound producing action connected to the wind-inducing device, a normally open valve in the latter connection, and separate pneumatic actuators for said valves under the control of the operator whereby the normally closed valve may be opened and the normally open valve closed for cutting off communication between the wind-inducing device and sound producing action and simultaneouly throwing the full force of the wind-inducing device into the motor action.

15. In a pneumatic self-playing musical instrument, a wind-inducing device, a motor action connected thereto, a normally deflated pneumatic actuator for said valve, a sound producing action connected to the wind-inducing device, a valve in such connection, a normally inflated pneumatic actuator for the latter valve, means under the control of the operator for admitting atmospheric air to the first named actuator, and separate means controlled by the first named means for placing the second named actuator in communication with the exhaust device whereby its valve is closed simultaneously with the opening of the other valve.

In witness whereof I have hereunto set my hand this 20th day of July, 1906.

LEWIS B. DOMAN.

Witnesses:
C. L. HAMLIN,
M. E. ELLIOTT.